March 7, 1933.  A. G. F. WALLGREN  1,900,874
BEARING
Filed May 10, 1930

INVENTOR
August Gunnar Ferdinand Wallgren
BY
his ATTORNEY

Patented Mar. 7, 1933

1,900,874

UNITED STATES PATENT OFFICE

AUGUST GUNNAR FERDINAND WALLGREN, OF STOCKHOLM, SWEDEN, ASSIGNOR TO AKTIEBOLAGET NOMY, OF STOCKHOLM, SWEDEN, A CORPORATION OF SWEDEN

BEARING

Application filed May 10, 1930, Serial No. 451,233, and in Sweden May 15, 1929.

My invention relates to bearings. More specifically my invention relates to bearings of the type in which a plurality of bearing blocks having extended bearing surfaces are mounted to cooperate when the bearing is in operation with a complementary bearing surface to form a load-sustaining liquid film (ordinarily of lubricant) between said surfaces. Still more specifically my invention relates to the above type of bearing in which the bearing blocks are supported by and move with one of the bearing members, being tiltably mounted with respect thereto so that a wedge-shaped space opening in the direction of movement of the bearing blocks is provided in order to form and retain the load-sustaining film.

In bearings of the above type the load-sustaining characteristics of the liquid film formed in the bearing are such that extremely high unit bearing pressures may be employed. However, a certain limited movement of the bearing from a position of rest is required before the load-sustaining film is properly formed. This may result, in cases where bearings are started from rest under full load conditions, in a limited amount of relative movement of the bearing surfaces when such surfaces are in direct metal-to-metal contact. Such action tends to produce wear on the surfaces and may even cause scoring thereof. Such wear is materially more detrimental in bearings of the described character than in ordinary sliding bearings, since any deviation of the bearing surfaces from their proper contour interferes with the proper formation and retention of the load-sustaining liquid film. This is particularly true in the case of scored surfaces, the scores providing channels through which the liquid film finds an easy outlet from between the bearing surfaces.

The principal object of my invention is to overcome the difficulties due to wear in such bearings, and I prevent such wear by providing the parts of the bearing with cooperating load-sustaining or load-transmitting surfaces of such extreme hardness that said surfaces can operate for limited periods in direct metallic contact without deterioration.

The manner in which the invention is carried into effect may best be understood from the following description of one form of bearing embodying the invention which is illustrated in the accompanying drawing forming a part of this specification.

Figure 1:
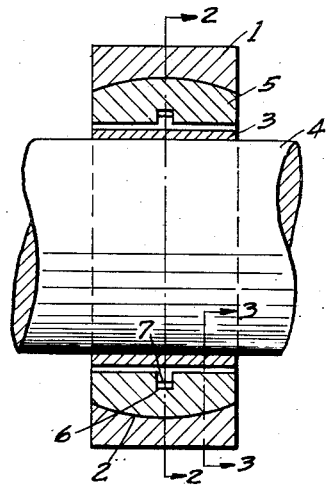
Fig. 1 is an axial section of the bearing shown in Fig. 2 and taken on the line 1—1 of the latter figure;

Referring now to the figures, the bearing comprises an outer bearing member 1, the inner spherically curved surface 2 of which forms an extended bearing surface. Within the bearing member 1 is an inner bearing member 3 mounted upon and adapted to rotate with shaft 4. Radially between the inner and outer members is a series of bearing blocks 5, having extended spherical bearing surfaces adjacent to and cooperating with surface 2. The blocks 5 are carried with the bearing member 4 in rotation and the spherical surfaces are the bearing surfaces which slide relative to each other.

Figure 2:
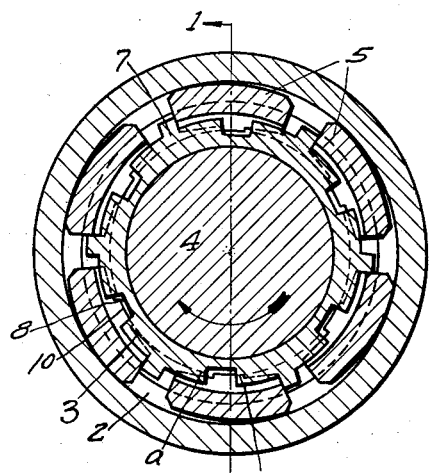
Fig. 2 is a transverse section taken on the line 2—2 of Fig. 1.
Figure 3:
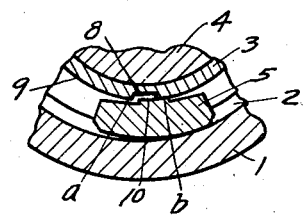
Fig. 3 is a fragmentary transverse section taken on the line 3—3 of Fig. 1.
Figure 4:
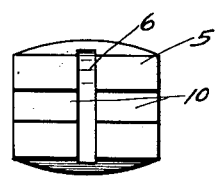
Fig. 4 is an elevation of a bearing block showing the side upon which are formed the supporting surfaces.

Each block 5 has a transverse groove 6 (see Figs. 1 and 4) into which projections 7 on member 3 extend to prevent relative axial movement of blocks 5 and member 3. Projections 7 also form abutments (as seen in Fig. 2) for engaging the ends of the blocks to move them rotationally with member 3.

The inner bearing member 3 is provided with transverse grooves 8 between which are located the cylindrical surfaces 9, forming a series of steps providing supporting surfaces at the edges *a* and *b* of grooves 8. Blocks 5 are provided with transverse projections 10 wider than grooves 8 and adapted to engage either surfaces *a* or surfaces *b*, depending upon the direction of rotation of the bearing. As will be seen from Fig. 2, the blocks are held rotationally with respect to member 3 by the abutments on projections 7 so that the point of contact between the projections 10 and the surfaces *a* or *b* is eccentric with respect to the centers of the blocks. This causes the blocks, upon rotation thereof, to assume a tilted position forming a wedge-shaped space between the spherical bearing surfaces of the blocks and the cooperating surface 2 of the outer bearing member. The wedge-shaped spaces, as indicated in Fig. 2, open toward the direction of rotation of the inner bearing member and the blocks to cause a load-sustaining liquid film to be formed by the lubricant between these surfaces. Upon reversal of direction of rotation from that shown in Fig. 2, the bearing blocks shift to oppositely tilted positions with the projections 10 in contact with the surfaces *a* and with the wedge-shaped spaces between the blocks and the outer bearing member opening in the opposite direction.

The type of bearing just described is more fully disclosed in my copending application Serial No. 277,769, filed May 14th, 1928, Patent No. 1,871,485, granted August 16, 1932, to which reference may be had for a more detailed description.

It will be seen that in bearings of the type illustrated the surfaces which require the maximum hardness are the surface 2 of the outer member 1 and the spherical curved surfaces of the bearing blocks, since these surfaces are the ones which slide relative to each other and which may be in sliding metal-to-metal contact during starting periods before the formation of the load-sustaining liquid film between them. It is, however, also important that the surfaces *a* and *b* and the cooperating surfaces of the projections 10 be of relatively great hardness, since these load-sustaining surfaces are of relatively small area and the unit stresses thereon are extremely high.

In accordance with my invention, the desired hardness of the bearing surfaces is secured by treating the parts to form a surface layer as distinguished from the body portion of the parts, such surface layer being of extreme hardness.

The required degree of hardness is advantageously secured by making the surface layers of the parts having the bearing surfaces of a metal other and harder than the metal forming the body portions of the parts. I prefer to make the body portions of the parts of a ferrous metal usually of steel having a low carbon content. Such steel may or may not be alloyed with other elements to increase its toughness, which is a desirable physical characteristic for the body portions of the parts. The surface layers I prefer to form from some one of the non-ferrous metals the characteristic of which is extreme hardness and which may be applied to the parts so that it adheres thereto to a degree uniting the body portions and the surface layers of the parts into integral wholes.

I have found chrome (chromium) to be a metal having the desired characteristics, and in accordance with my invention I form surface layers of chrome at the places desired by depositing the metal electrolytically on the body portions. In carrying out this process, the chrome is not deposited directly upon the steel forming the body portions, but is deposited upon a very thin layer of copper which has previously been deposited by electrolytic action on the areas of the body portions over which the chrome surface layers are to be formed.

Figure 6:
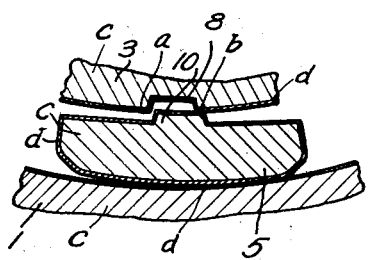
Fig. 6 is a fragmentary section, on an enlarged scale, similar to Fig. 3 and indicating the hardened surfaces.
Figure 5:
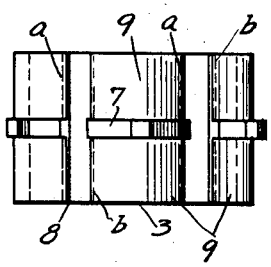
Fig. 5 is an elevation of the bearing member which supports the bearing blocks.

In Fig. 6 I have illustrated diagrammatically parts which have been treated in accordance with the invention, the body portions of the parts being indicated at *c* and the surface layers at *d*. In the figure the blocks and the inner bearing member have been shown as being completely treated. If desired, however, the surface layers *d* may be formed only at the places desired, such for example, as the surfaces *a* and *b* and the cooperating surfaces on projections 10 or the spherical curved bearing surfaces on the blocks and the outer member. Obviously, all of the load carrying or transmitting surfaces may be treated without treating the surfaces which are not subjected to load. Localization of the surfaces treated may be accomplished by suitably coating the parts before they are treated with non-metallic substance of a character which will prevent electrolytic deposition of metal on the portions of the parts which are coated.

From the above it will be seen that in accordance with my invention the bearing parts may be made with the desired hardness at the necessary points without resorting to the use of special steels which may be hardened by heat treatment, such steels in the first place being incapable of being hardened to the degree desired, and in the second place being much more difficult to handle in manufacture than are the steels which may be treated in accordance with the present invention to secure bearing surfaces of the proper hardness.

While I have shown one form of bearing embodying the invention and have given a specific example of treatment, the invention is obviously subject to variation and modification and is not limited to the form given herein by way of example.

What I claim is:

1. A bearing of the character described comprising an outer annular member, an inner annular member and a plurality of bearing blocks having operative positions between the annular members, one of said members comprising a body portion and supporting layer portions, the other of said members having a body portion and a layer portion forming a bearing surface, said blocks having a body portion, supporting layer portions and layer portions forming bearing surfaces, one group of said supporting portions being recessed and another group of supporting portions projecting and cooperating with the recessed supporting portions to tilt the blocks, said bearing surfaces cooperating to transmit load through the bearing, said body portions consisting of a ferrous metal and said layer portions consisting of a non-ferrous metal of greater hardness than the ferrous metal.

2. A bearing of the character described comprising an outer annular member, an inner annular member and a plurality of bearing blocks having operative positions between the annular members, one of said members comprising a body portion and supporting layer portions, the other of said members having a body portion and a layer portion forming a bearing surface, said blocks having a body portion, supporting layer portions and layer portions forming bearing surfaces, one group of said supporting portions being recessed and another group of supporting portions projecting and cooperating with the recessed supporting portions to tilt the blocks, said bearing surfaces cooperating to transmit load through the bearing, said body portions consisting of steel and said layer portions consisting of chrome.

3. In a bearing of the character described, a bearing member and a plurality of bearing blocks having operative positions adjacent to said member, said member and each of said blocks having peripherally spaced cooperating surfaces arranged to provide alternative peripherally spaced supports for causing movement of the blocks in one direction with respect to said member to tilt the blocks up on one side and movement of the blocks in the other direction with respect to said member to tilt the blocks up on the opposite side, said member and said blocks each having a body portion consisting of ferrous metal and a surface layer, said surface layers providing the aforementioned cooperating bearing surfaces and consisting of a non-ferrous metal of greater hardness than the ferrous metal.

4. A bearing of the character described comprising an outer annular member, an inner annular member and a plurality of bearing blocks having operative positions between the annular members, one of said members and each of said blocks having peripherally spaced cooperating surfaces arranged to provide alternative peripherally spaced supports for causing movement of the blocks in one direction with respect to said one member to tilt the blocks up on one side to provide a wedge shaped space opening in said one direction between cooperating bearing surfaces on each block and the other of said members and movement of the blocks in the other direction with respect to said one member to tilt the blocks up on the opposite side to provide a wedge shaped space opening in said other direction between the said cooperating bearing surfaces on each block and the other of said members, said blocks and the other of said members each comprising a body portion of ferrous metal and a surface layer portion providing said cooperating bearing surfaces, said surface layer portion being of a non-ferrous metal of greater hardness than the ferrous metal.

5. A bearing of the character described comprising an outer annular member, an inner annular member and a plurality of bearing blocks having operative positions between the annular members, one of said members and each of said blocks having peripherally spaced cooperating surfaces arranged to provide alternative peripherally spaced supports for causing movement of the blocks in one direction with respect to said one of said members to tilt the blocks up on one side and movement of the blocks in the other direction with respect to said one of said members to tilt the blocks up on the opposite side, said blocks and the other of said members having cooperating relatively slidable surfaces providing a wedge shaped space between said other of said members and each of the blocks upon tilting of the blocks, said members and each of said blocks comprising a body portion of ferrous metal and surface layer portions providing said cooperating peripherally spaced surfaces and said cooperating sliding surfaces, said surface layer portions consisting of a non-ferrous metal having a hardness of the order of the hardness of chrome.

In testimony whereof I have affixed my signature.

AUGUST GUNNAR FERDINAND WALLGREN.